(12) United States Patent
Akahori et al.

(10) Patent No.: US 6,521,024 B1
(45) Date of Patent: Feb. 18, 2003

(54) SEAL PLATE AND PRESSURE ADJUSTING MECHANISM FOR THE SEAL PLATE

(75) Inventors: Masami Akahori, Shizuoka (JP); Jo Matsune, Nihonmatu (JP); Koichi Ohno, Tatikawa (JP); Zituhiko Hayashi, Hatioji (JP); Koichi Yokose, Hatioji (JP); Yuichi Kuroki, Fujisawa (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 09/674,521

(22) PCT Filed: Mar. 17, 2000

(86) PCT No.: PCT/JP00/01668
§ 371 (c)(1),
(2), (4) Date: Nov. 20, 2000

(87) PCT Pub. No.: WO00/55877
PCT Pub. Date: Sep. 21, 2000

(30) Foreign Application Priority Data

Mar. 18, 1999 (JP) .............................. 11-073123
Oct. 15, 1999 (JP) .............................. 11-293989

(51) Int. Cl.$^7$ .............................................. B01D 53/22
(52) U.S. Cl. ........................... 96/4; 96/6; 96/12; 96/14
(58) Field of Search ........................... 96/4, 6, 7, 12–14

(56) References Cited

U.S. PATENT DOCUMENTS

| | | | | | |
|---|---|---|---|---|---|
| 2,452,066 A | * | 10/1948 | Murphy | ........................ | 96/4 X |
| 2,732,092 A | * | 1/1956 | Lawrence | .................. | 96/12 X |
| 3,229,023 A | * | 1/1966 | Bolton et al. | ................ | 96/12 X |
| 3,575,170 A | * | 4/1971 | Clark | ............................... | 96/6 |
| 3,631,654 A | * | 1/1972 | Riely et al. | ....................... | 96/6 |
| 3,828,527 A | * | 8/1974 | Briggs et al. | .................... | 96/4 |
| 3,909,302 A | * | 9/1975 | Mermelstein | ................ | 96/6 X |
| 4,190,426 A | * | 2/1980 | Ruschke | ......................... | 96/6 |
| 4,274,848 A | * | 6/1981 | La Gro | .............................. | 96/6 |
| 4,445,884 A | * | 5/1984 | Kurtz et al. | .................. | 96/6 X |
| 4,856,013 A | * | 8/1989 | Rio et al. | ........................ | 96/6 |
| 4,957,518 A | * | 9/1990 | Brassell | .......................... | 96/4 |
| 4,957,522 A | * | 9/1990 | Brassell | .......................... | 96/4 |
| 5,019,140 A | * | 5/1991 | Bowser et al. | .................. | 96/6 |
| 5,037,457 A | * | 8/1991 | Goldsmith et al. | ........... | 96/12 |
| 5,066,683 A | * | 11/1991 | Dillon et al. | ................ | 96/4 X |
| 5,348,570 A | * | 9/1994 | Ruppert, Jr. et al. | ............ | 96/6 |
| 5,522,769 A | * | 6/1996 | DeGuiseppi | ................. | 96/6 X |
| 5,750,283 A | * | 5/1998 | DePalma et al. | ............. | 429/56 |
| 5,901,867 A | * | 5/1999 | Mattson | ....................... | 215/261 |
| 5,914,415 A | * | 6/1999 | Tago | .......................... | 96/13 X |
| 5,971,221 A | * | 10/1999 | Schwarz | ...................... | 96/4 X |
| 6,092,812 A | * | 7/2000 | Ursel et al. | .................. | 96/6 X |
| 6,132,900 A | * | 10/2000 | Yoshizawa et al. | ......... | 429/185 |
| 6,168,653 B1 | * | 1/2001 | Myers | ............................. | 96/4 |
| 6,171,368 B1 | * | 1/2001 | Maget et al. | ................ | 96/4 X |

FOREIGN PATENT DOCUMENTS

| | | |
|---|---|---|
| JP | 50-20262 | 6/1975 |
| JP | 3-110828 | 11/1991 |
| JP | 11-7941 | 1/1999 |

* cited by examiner

Primary Examiner—Robert H. Spitzer
(74) Attorney, Agent, or Firm—Jacobson Holman PLLC

(57) ABSTRACT

To prevent a pressure container of a battery, a condenser or the like from exploding due to an abnormal increase of a pressure within the pressure container without having a rubber breaking plate with which it is hard to control the breaking pressure, there is provided a breaking plate integrally formed with a resin seal plate main body for closing an opening portion of a pressure container, a thin portion integrally formed between the seal plate main body and the breaking plate and being thinner than the breaking plate, and an inclined surface portion formed to be gradually thicker from a thickness of the thin portion and provided in a peripheral edge portion of the breaking plate.

9 Claims, 12 Drawing Sheets

A

B

SEAL PLATE AND PRESSURE ADJUSTING MECHANISM FOR THE SEAL PLATE

TECHNICAL FIELD

The present invention relates to a seal plate of a pressure container or a pressure adjusting mechanism for a seal plate. For example, the present invention relates to a seal plate or a pressure adjusting mechanism for a seal plate which is used in a battery (including a primary battery and a secondary battery) or a condenser (including an electrolytic condenser and an electric double layer condenser) or the like.

BACKGROUND ART

In conventional, a seal plate 51 shown in FIG. 12 has been known and is structured as follows.

That is, at first, there is provided a resin seal plate main body 52 for closing an opening portion 62 of a pressure container 61 for a secondary battery, an aluminum electrolytic condenser, an electric double layer condenser or the like, and a pair of metal terminals 53 and 53 are mounted to the seal plate main body 52. Further, there is provided an explosion preventing valve portion 54 having a breaking plate 55 breaking at a time when an internal pressure of the pressure container 61 reaches a predetermined value so as to release the internal pressure and preventing the pressure container 61 from exploding, in the seal plate main body 52.

However, the following disadvantages exist in the seal plate 51.

That is, at first, a rubber valve is attached to the explosion preventing valve portion 54 as an independent part, and the rubber valve breaks when the internal pressure in the sealed side abnormally increases, thereby functioning to stop an operation of the battery, the condenser or the like. However, since a material thereof is a rubber material, a dispersion of the breaking pressure is large and it is hard to control the breaking pressure.

Further, since a breather portion is not provided in the seal plate 51 mentioned above, it is necessary to previously keep a space for absorbing a temperature increase at a time when an electrolyte is reacted and an internal pressure increase due to a generated gas within the pressure container 61, so that there is a disadvantage that it is impossible to make the pressure container 61 compact.

The present invention is made by taking the points mentioned above into consideration, and an object of the present invention is to provide a seal plate in which a dispersion of a breaking pressure of a breaking plate can be reduced so that the breaking pressure can be easily controlled, and it is not necessary to provide a pressure absorbing space within a pressure container, whereby it is possible to make the pressure container compact, in comparison with the conventional art mentioned above.

Further, an object of the present invention is to provide a pressure adjusting mechanism for a seal plate which is not consumable at a time as the breaking plate in the explosion preventing valve mentioned above but can be continuously used after a pressure within the pressure container is released, does not require a pressure absorbing space provided within the pressure container, whereby it is possible to make the pressure container compact, and can serve with a stable operation characteristic.

Further, an object of the present invention is to provide a seal plate or a pressure adjusting mechanism for a seal plate which can prevent the pressure container from exploding due to an abnormal increase of a pressure within the pressure container even without having a rubber breaking plate with which it is hard to control the breaking pressure.

DISCLOSURE OF THE INVENTION

In order to achieve the object mentioned above, there is provided a seal plate characterized in that a breaking plate is integrally formed with a resin seal plate main body for closing an opening portion of a pressure container.

Further, there is provided a seal plate characterized by a breaking plate integrally formed with a resin seal plate main body for closing an opening portion of a pressure container, a thin portion integrally formed between the seal plate main body and the breaking plate and being thinner than the breaking plate, and an inclined surface portion formed to be gradually thicker from a thickness of the thin portion and provided in a peripheral edge portion of the breaking plate.

Further, there is provided a seal plate characterized in that a scattering prevention member such as a stop ring or the like for preventing the breaking plate from scattering to the outside of the seal plate when the breaking plate is broken is provided.

Further, there is provided a seal plate characterized in that a breather portion having a function membrane with gas permeability and liquid impermeability is provided.

Further, there is provided a pressure adjusting mechanism used in a pressure container such as a battery, an aluminum electrolytic condenser, an electric double layer condenser or the like, characterized by a function membrane releasing a pressure of the pressure container when the pressure becomes high and sucking a gas when the pressure becomes low, thereby keeping the inside of the pressure container at an atmospheric pressure, the function membrane being constituted by a porous body.

Further, there is provided a pressure adjusting mechanism characterized in that a water repellent treatment is applied to the function membrane so as to prevent a liquid from soaking into the function membrane constituted of a porous body.

Further, there is provided a pressure adjusting mechanism characterized in that a pressing member is provided so as to prevent the function membrane constituted of a porous body or a holding body thereof from being deformed to a certain level or more due to a pressure.

Further, there is provided a pressure adjusting mechanism characterized in that there is a function membrane structured such that a membrane-like porous body is formed by processing a PTFE material by a drawing method and a water repellent treatment is applied by coating fluoro chemicals.

Further, there is provided a pressure adjusting mechanism characterized in that a rubber-like elastic seal member for covering both sides in a direction of a membrane thickness and an outer peripheral side of a peripheral edge portion of the function membrane is assembled with the function membrane.

Further, there is provided a pressure adjusting mechanism characterized in that a rubber-like elastic seal member is assembled with both sides in a direction of a membrane thickness of the function membrane by an integral molding.

In the seal plate in accordance with the present invention provided with the structure mentioned above, since the breaking plate is integrally formed with the resin seal plate main body from the same kind of resin material, it is possible to make a dispersion of the breaking pressure smaller than the conventional one due to a material property of the resin material. Further, since the seal plate main body and the breaking plate are integrally formed instead of separated parts, it is possible to reduce the number of the parts.

Further, if the breaking plate is formed so as to have a uniform thickness at a time of integrally forming the breaking plate with the seal plate main body, there is a case that the breaking pressure can not be sufficiently controlled because the breaking plate is broken at an uncertain portion. With respect to this matter, as the seal plate in accordance with claim 2 of the present invention, it is effective to integrally form the thin portion thinner than the breaking plate between the seal plate main body and the breaking plate and provide the inclined surface portion being made gradually thicker from the thickness of the thin portion in the peripheral edge portion of the breaking plate. As mentioned above, when the thin portion being thinner than the breaking plate is integrally formed between the seal plate main body and the breaking plate and the inclined surface portion being made gradually thicker from the thickness of the thin portion is provided in the peripheral edge portion of the breaking plate, it is possible to concentrate the breaking portion in the thin portion, and thereby further easily control the breaking pressure.

In this case, in accordance with tests performed by the inventors of the present application, when an angle of incline of the inclined surface portion with respect to the breaking plate flat surface is set to 30 degrees or more, the angle of incline is particularly effective.

Further, an actual value of the breaking pressure can be selected in a design stage by suitably adjusting an inner diameter of the pressure releasing port (an outer diameter of the thin portion), an outer diameter of the breaking plate (an inner diameter of the thin portion), a thickness of the breaking plate, a thickness of the thin portion, an angle of incline of the inclined surface portion with respect to the breaking plate flat surface or the like.

Further, in addition, in the seal plate in accordance with the present invention provided with the structure mentioned above, it is possible to prevent the breaking plate from scattering to the outside of the seal plate when the breaking plate is broken. Further, in the seal plate it is possible to provide a breather function in the seal plate, and it is possible to provide a function for adjusting the pressure as well as for permeating the gas without permeating the liquid.

Further, the pressure adjusting mechanism is structured such as to be employed for the pressure container of the battery, the aluminum electrolytic condenser, the electric double layer condenser or the like in place of the explosion preventing valve in the prior art mentioned above. Since there is provided the function membrane releasing the pressure when the pressure within the pressure container becomes high and sucking the gas when the pressure within the pressure container becomes low so as to keep the inside of the pressure container in the atmospheric pressure, the function membrane being constituted by the porous body, it is possible to keep the pressure within the pressure container constant due to the gas permeable function or the breather function by the function membrane. Further, since there is no one-time consumable parts such as the breaking plate in the explosion preventing valve mentioned above, it is possible to continuously use the pressure adjusting mechanism after releasing the pressure within the pressure container. Further, since it is possible to set such as to optionally release the pressure without waiting that the pressure within the pressure container reaches a predetermined value, it is not necessary to provide the pressure absorbing space within the pressure container.

Further, in addition, in the pressure adjusting mechanism since the water repellent treatment is applied to the function membrane constituted of the porous body so as to prevent the liquid from soaking into the function membrane constituted of the porous body, it is possible to prevent the liquid such as the electrolyte or the like within the pressure container from permeating through the function membrane so as to leak to the outside.

Further, in the pressure adjusting mechanism since the pressing member is provided so as to prevent the function membrane constituted of the porous body or the holding body thereof from being deformed to a certain level or more due to the pressure, it is possible to prevent the function membrane or the holding body from being deformed and broken due to the high pressure within the pressure container or the like.

Further, in the pressure adjusting mechanism since the membrane-like porous body is formed by processing the PTFE material by the drawing method and the water repellent treatment is applied to the function membrane by coating the fluoro chemicals on the porous body, it is possible to constitute the function membrane excellent in a chemicals resistance by making the best use of the property that the PTFE is excellent in the chemicals resistance, and it is possible to effectively produce a lot of the function membranes by punching out from one drawn sheet.

Further, in the pressure adjusting mechanism since the rubber-like elastic seal member covering both sides in the direction of the membrane thickness and the outer peripheral side of the peripheral edge portion of the function membrane is assembled with the function membrane, it is possible to improve assembly efficiency and sealing performance.

Further, in the pressure adjusting mechanism since the rubber-like elastic seal member is assembled with both sides in the direction of the membrane thickness of the function membrane by the integral molding, it is also possible to improve assembly efficiency and sealing performance.

MOST PREFERRED EMBODIMENT OF THE INVENTION

Figure 1:
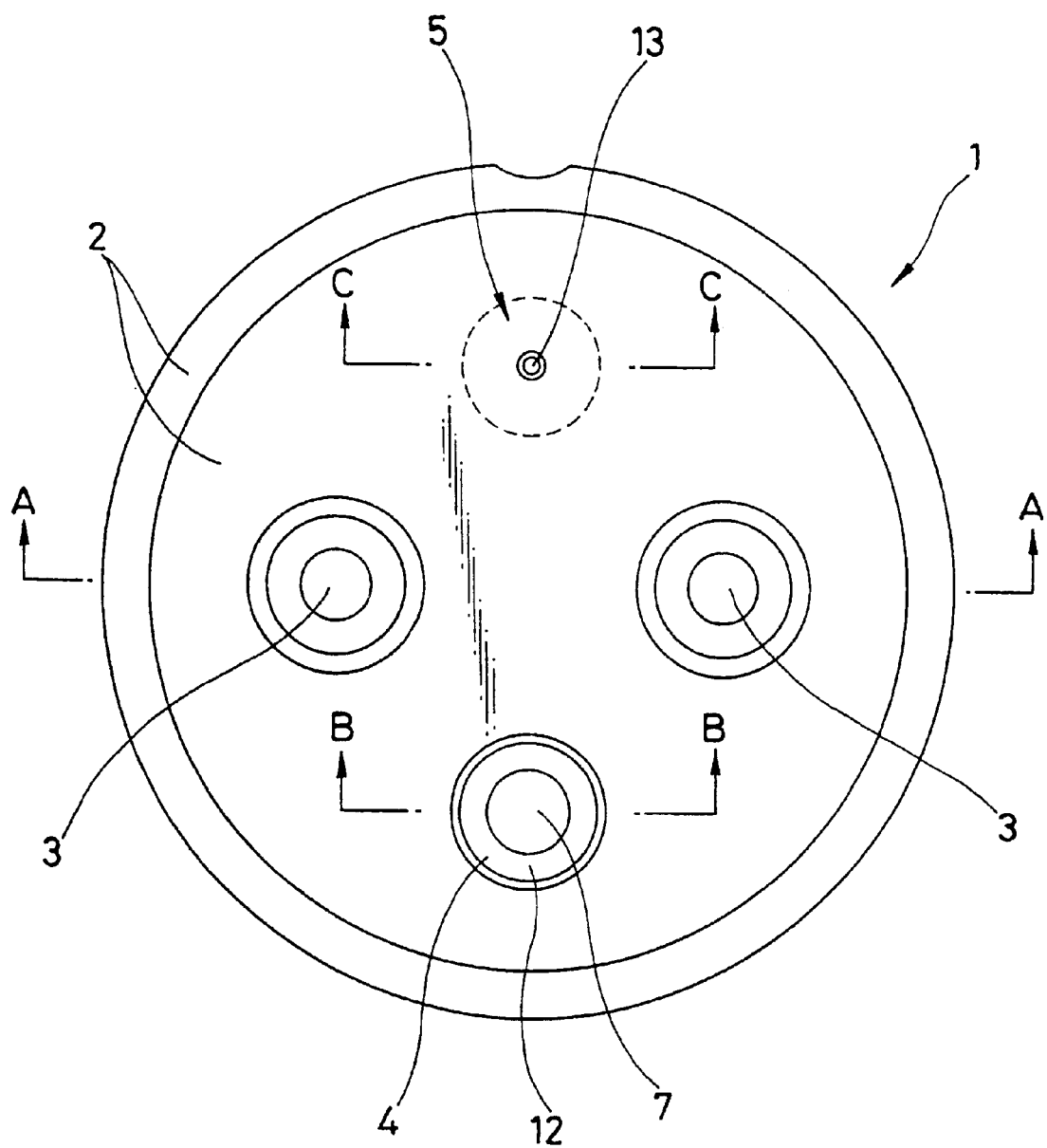
FIG. 1 is a plan view of a seal plate in accordance with a first embodiment of the present invention.
Figure 2:
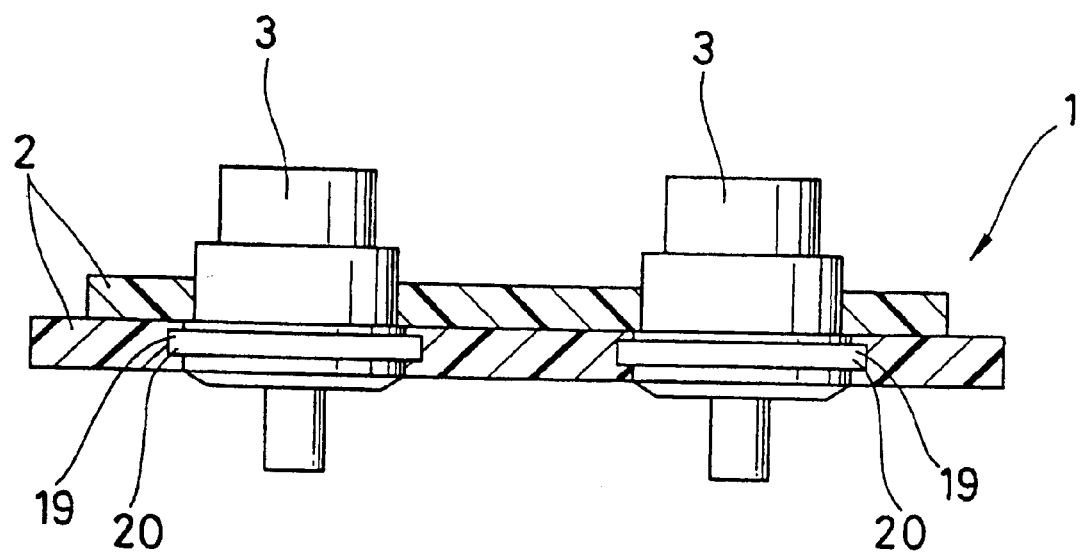
FIG. 2 is a cross sectional view taken along a line A—A in FIG. 1.
Figure 3:
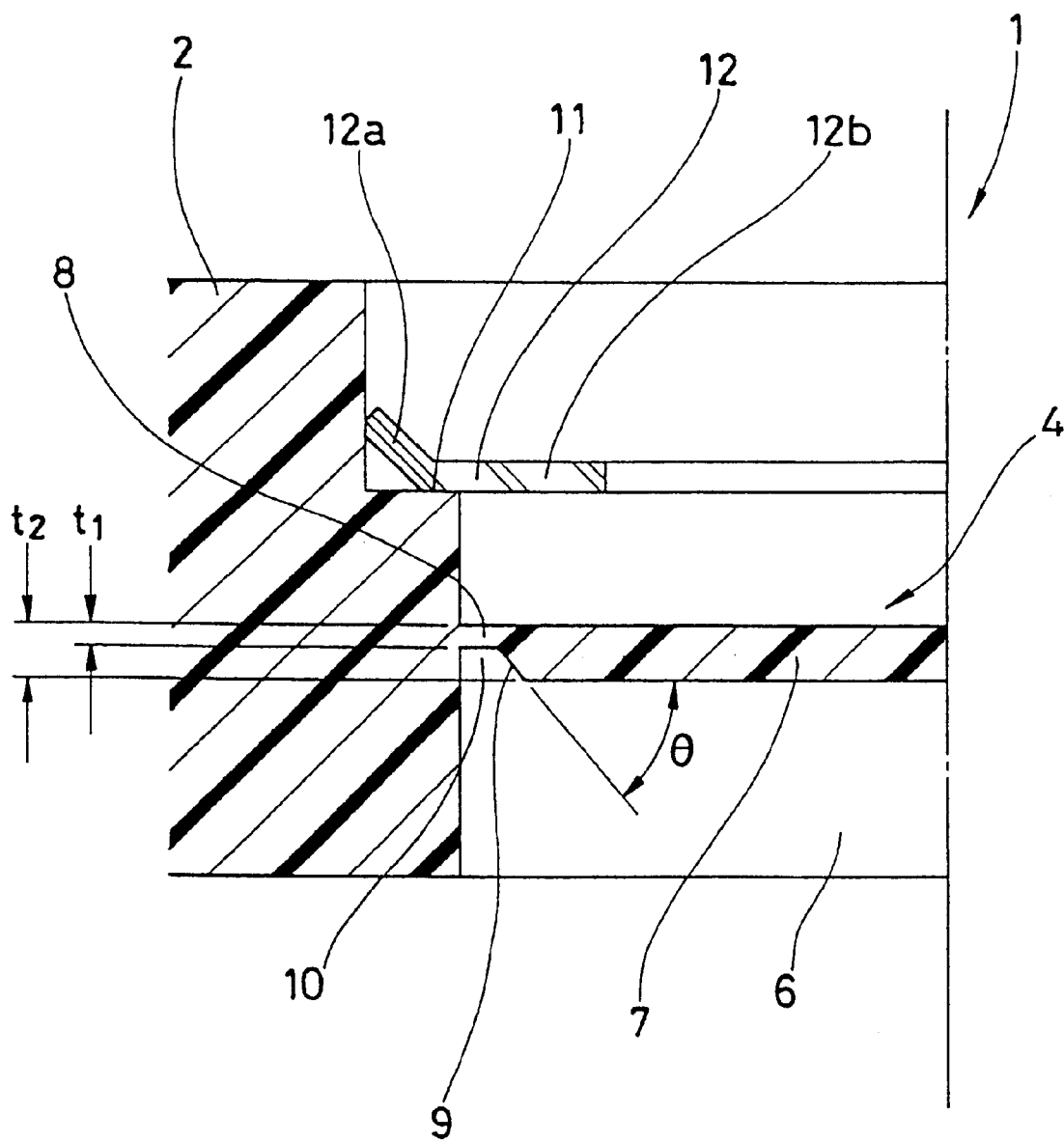
FIG. 3 is an enlarged half cross sectional view taken along a line B—B in FIG. 1 and a half cross sectional view of an explosion preventing valve portion.
Figure 4:
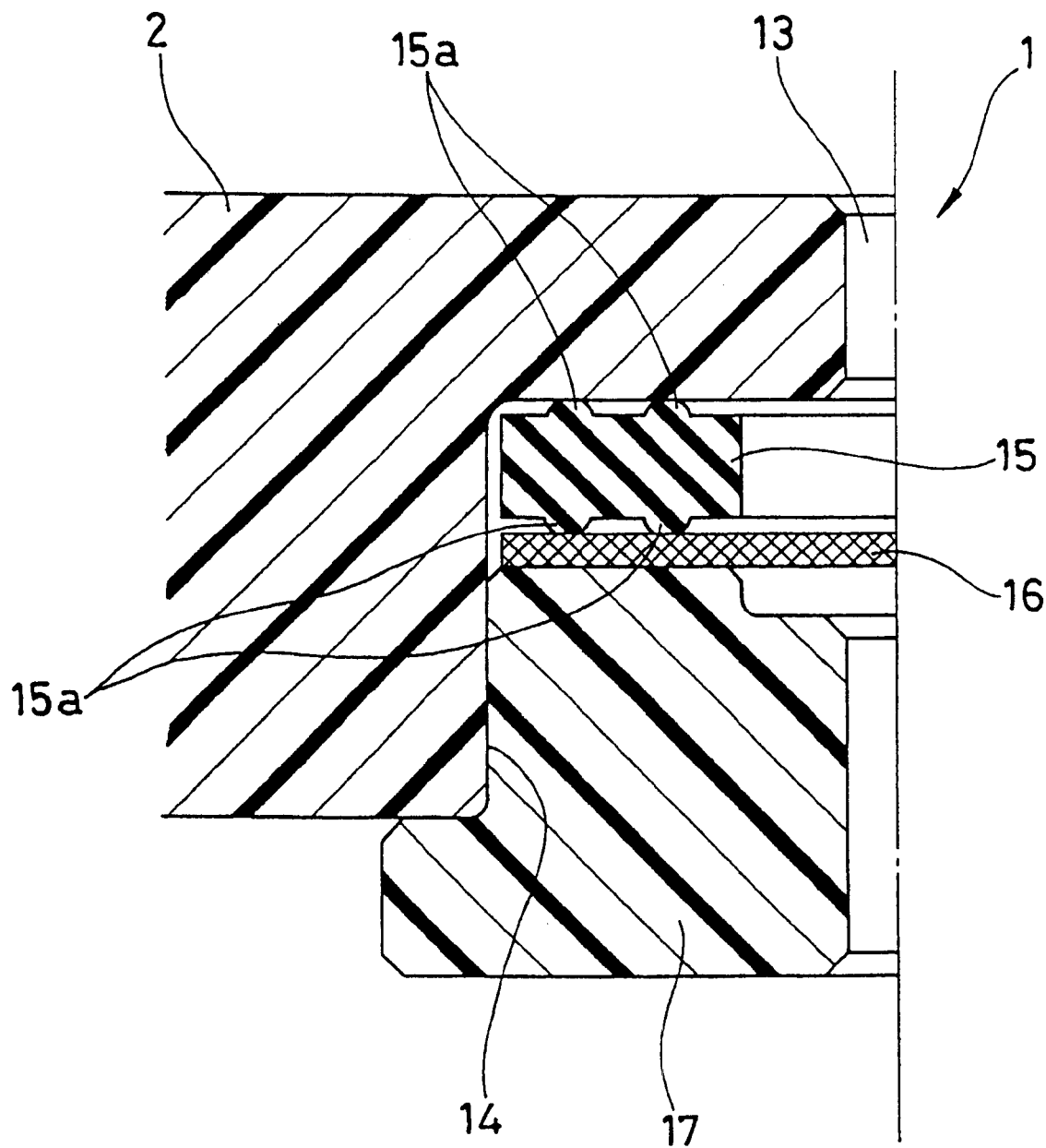
FIG. 4 is an enlarged half cross sectional view taken along a line C—C in FIG. 1 and a half cross sectional view of a breather portion.
Figure 5:
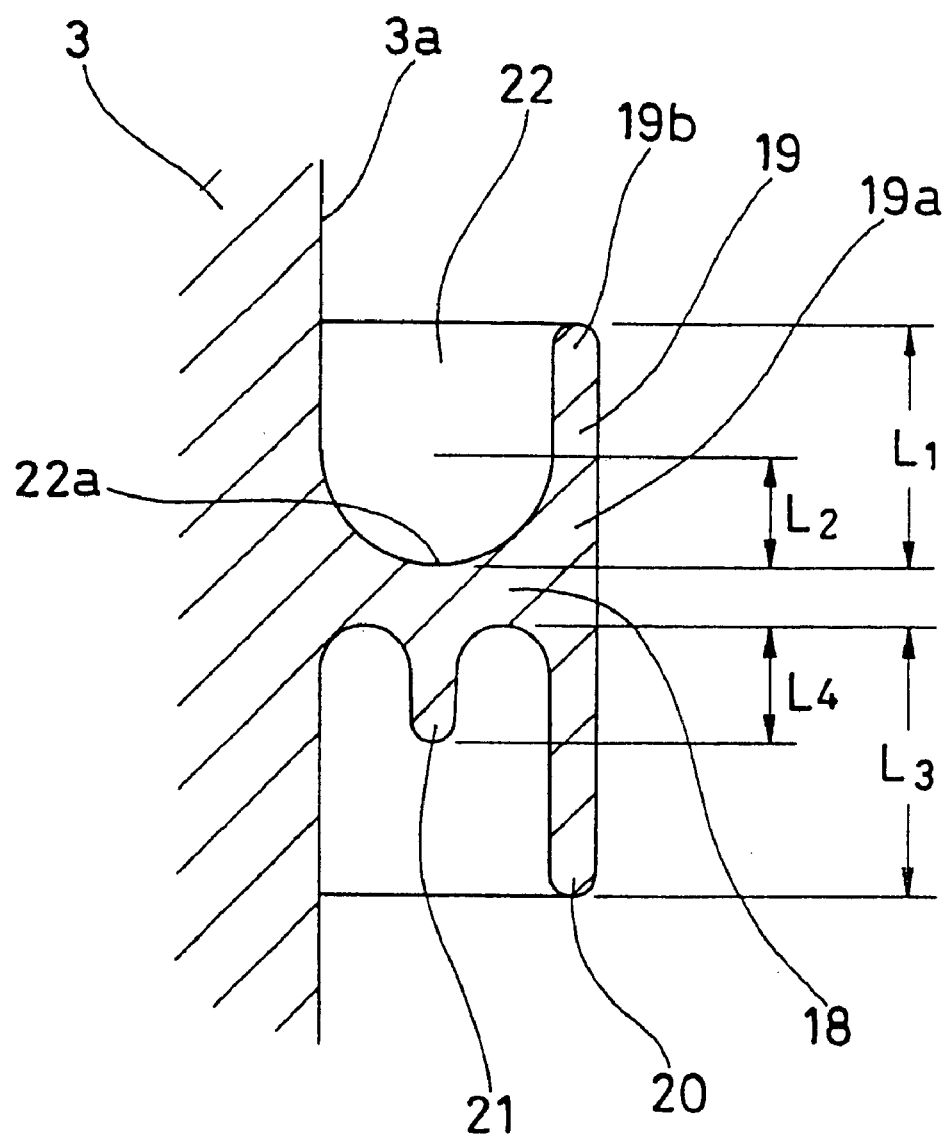
FIG. 5 is an enlarged cross sectional view of a main portion of a metal terminal.

Next, a description will be given of embodiments in accordance with the present invention with reference to the accompanying drawings.
First Embodiment FIG. 1 is a plan view of a seal plate 1 in accordance with a first embodiment of the present invention, and a cross sectional view taken along a line A—A thereof is shown in FIG. 2. Further, FIG. 3 is an enlarged half cross sectional view taken along a line B—B in FIG. 1, FIG. 4 is an enlarged half cross sectional view taken along a line C—C in FIG. 1, and FIG. 5 is an enlarged cross sectional view of a main portion of a metal terminal 3.

Figure 12:
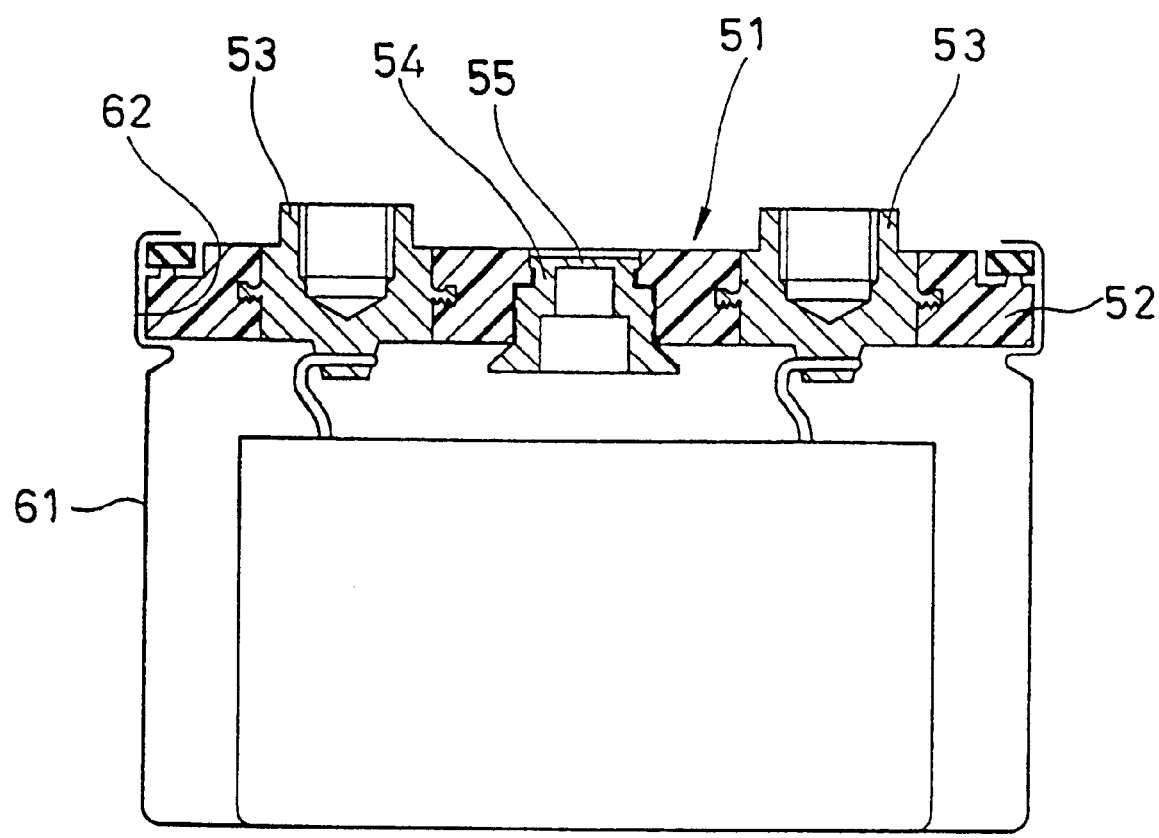
FIG. 12 is a schematic view of a structure of a pressure container provided with a seal plate in accordance with a conventional art.

The seal plate 1 in accordance with the embodiment closes an opening portion of a pressure container (not shown, refer to FIG. 12) such as an aluminum electrolytic condenser, an electric double layer condenser or the like, and is structured as follows.

That is, at first, there is provided a resin seal plate main body (refer to as a seal plate in a narrow sense) 2 formed in a convex or flat plate shape and closing the opening portion of the pressure container, and the seal plate main body 2 is formed from a resin material constituted of a predetermined polymer material such as a bakelite, PPS or the like so as to be a disc-like product.

On the assumption that a flat surface of the seal plate main body 2 is a clock dial, a pair of metal terminals 3 and 3 are normally provided at positions showing three o'clock and nine o'clock, an explosion preventing valve portion 4 or a breather portion 5 is normally provided at a position showing six o'clock or twelve o'clock, and further the breather portion 5 or the explosion preventing valve portion 4 is provided at a position showing twelve o'clock. There is another structure in which one metal terminal is provided in the seal plate and one metal terminal is provided in a bottom portion of the pressure container. In this case, the metal terminal and the breather portion are normally provided at the position showing three o'clock and nine o'clock in the seal plate.

As shown in FIG. 3 in an enlarged manner, the explosion preventing valve portion 4 is structured as follows.

That is, at first, a hole-like pressure releasing port 6 extending through in a thickness direction is provided at a predetermined portion of the seal plate main body 2, a breaking plate 7 formed in a flat plate shape is provided in an inner portion of the pressure releasing port 6, and the breaking plate 7 is integrally formed with the seal plate main body 2 from the same kind of resin material. The pressure releasing port 6 is opened so as to form a circular shape in a plan view, and the breaking plate 7 is formed in a disc shape so as to close the pressure releasing port 6 wholly.

Further, an annular thin portion 8 formed so that a thickness t1 thereof is thinner than a thickness t2 of the breaking plate 7 is integrally formed all around the periphery between the breaking plate 7 and the seal plate main body 2 in the peripheral edge portion of the breaking plate 7, and an annular inclined surface portion 9 formed so that a thickness thereof is gradually thicker from the thickness of the thin portion 8 (the thickness is gradually increased from t1 to t2) is also provided in all around the periphery of the peripheral edge portion of the breaking plate 7. An angle of incline θ of the inclined surface portion 9 with respect to the plane of the breaking plate 7 is set to a magnitude around 30 degrees or more than 30 degrees.

In this case, since the breaking plate 7 and the thin portion 8 are formed so that upper surfaces (outer surfaces) thereof are aligned with each other, the structure mentioned above can be expressed as follows.

That is, the breaking plate 7 is integrally formed with the resin seal plate main body 2 so as to close the pressure releasing port 6, an annular groove-like recess portion 10 is formed on a lower surface of the peripheral edge portion of the breaking plate 7 so as to specify a breaking portion of the breaking plate 7, and in order to surely break the breaking plate 7 at a portion forming the recess portion 10, the inclined surface portion 9 is formed on a side surface in an inner diameter side of the recess portion 10 (an outer peripheral surface of the breaking plate 7).

An annular step portion 11 is provided on an inner wall of the pressure releasing port 6 so as to be positioned at an upper side of the breaking plate 7, and a stop ring 12 as a scattering prevention member for preventing the breaking plate 7 from scattering to the outside of the pressure releasing port 6 at a time when the breaking plate 7 is broken is pressure inserted and fixed to the step portion 11 in such a manner as to be struck in an axial direction. The stop ring 12 is, for example, a CR-type stop ring, or annularly formed from a predetermined rigid material such as a metal or the like, and is structured such that an annular stopper portion 12b is integrally formed in an inner peripheral side of an annular mounting portion 12a. The mounting portion 12a is formed in a taper shape in a cross section, has a spring property, and fixes a whole of the stop ring 12 to the inner periphery of the pressure releasing port 6 due to the spring property. Further, the stopper portion 12b is structured such that an inner diameter is set to be smaller than an outer diameter of the breaking plate 7, whereby the breaking plate 7 can not pass through the inner periphery of the stopper portion 12b.

The explosion preventing valve portion 4 having the structure mentioned above is structured such that the breaking plate 7 is broken in the thin portion 8 when an internal pressure of the pressure container reaches a predetermined value, thereby releasing the internal pressure to the atmosphere. Accordingly, it is possible to previously prevent the internal pressure of the pressure container from being abnormally high, and the pressure container from being exploded.

Further, since the stop ring 12 as the scattering prevention member is provided in the outer side of the breaking plate 7, the breaking plate 7 does not scatter to the outside of the pressure releasing port 6 even when the breaking plate 7 is broken due to the internal pressure increase of the pressure container. Accordingly, it is possible to previously prevent the breaking plate 7 from scattering to the outside of the pressure releasing port 6 so as to collide with neighboring devices, and from breaking these devices.

Next, as shown in FIG. 4 in an enlarged manner, the breather portion 5 is structured as follows.

That is, at first, a hole-like ventilation flow passage 13 extending through in a thickness direction is provided at a predetermined position of the seal plate main body 2, a function membrane mounting space 14 is provided in an inner side of the ventilation flow passage 13, and a seal member 15 and a function membrane 16 are inserted to the mounting space 14 and held by a holding member 17.

Among them, at first, the function membrane 16 is a continuously ventilated porous body membrane made of a PTFE (a polytetrafluoroethylene) to which a water repellent treatment is applied, and has gas permeability and liquid impermeability as a characteristic thereof. Further, the function membrane 16 is formed in a membrane shape or a flat surface shape from the porous body so as to release the internal pressure of the pressure container to the outside when the internal pressure becomes higher than the atmospheric pressure and suck the atmospheric air when the internal pressure of the pressure container becomes lower than the atmospheric pressure, thereby keeping the inner portion of the pressure container at the atmospheric pressure, and is formed by processing the PTFE material excellent in a chemicals resistance by a drawing method so as to form a membrane-like porous body and coating a fluoro chemicals to the porous body so as to apply a water repellent treatment. Accordingly, the water repellent treatment is applied not only to the surface thereof but also to the inner portion of the porous body by the fluoro chemicals. A size of the hole in the porous body is actually set to about 0.05 to 1 $\mu$m. Accordingly, by satisfying these conditions, the breather function is achieved from a state that a difference in pressure between the inside and the outside of the pressure container is about 0.01 kg/cm$^2$ to keep the internal pressure of the pressure container at a certain level, so that there is structured a breather which prevents the pressure container from exploding and an interior sealed fluid such as an electrolyte or the like from leaking.

Further, in addition to PTFE, polyethylene, polypropylene, polyvinylidene fluoride (PVDF), cellulose acetate, polysulfone, polyacrylonitrile, polyamide, polyimide, polyamide imide or the like can be applied to the material of the function membrane 16, a producing method thereof can be selected in accordance with the material, the producing method includes a drawing method, a track etching method, a phase separation method, a phase transition method, a composite membrane method and the like, and the drawing method is suitable for PTFE as mentioned above.

In this case, the drawing method is a method of applying a heat to a crystalline polymer, adding a plasticizer so as to plasticize, thereafter drawing in a vertical direction, applying a strain to a film and expanding a periphery of a crystal area so as to form narrow holes, and can form a microfiltration membrane of polyethylene, polypropylene, PTFE or the like.

Further, the seal member 15 is annularly formed from a predetermined rubber-like elastic material such as a high saturated rubber or the like such as a silicone rubber, an ethylene propylene rubber (EPDM, EPM), a butyl rubber, a rubber obtained by adding hydrogen to an unsaturated rubber or the like, and prevents the fluid from passing through the outer peripheral portion of the function membrane 16 and a portion between the seal plate main body 2 and the holding member 17. In the illustrated seal member 15, in order to further increase sealing performance, annular beads 15a are respectively provided on the upper and lower surfaces thereof, however, the beads 15a are provided as occasion demands, so that the beads 15a may be omitted.

Further, the holding member 17 is annularly formed from a resin material comprising a predetermined polymer material such as PPS or the like, an aluminum material or the like, and is pressure-inserted and fixed to a mounting space 14 from an inner side thereof with a predetermined pressing margin. A function thereof is holding the seal member 15 and the function membrane 16 within the mounting space 14 as mentioned above and suitably compressing the seal member 15 so as to generate a predetermined seal surface pressure. A method of fixing the holding member 17 to the seal plate main body 2 may be welding, bonding or the like in addition to the pressing mentioned above.

The breather portion 5 having the structure mentioned above is structured such that since the function membrane 16 as a constituting part thereof has gas permeability and liquid impermeability and further has a filter function, a reaction gas of an electrolyte generated within the pressure container, particularly hydrogen gas, carbon dioxide or the like can permeate through the function membrane 16. Accordingly, it is possible to prevent the internal pressure of the pressure container from increasing due to generation of the reaction gas and prevent the internal fluid from leaking, prevent the external fluid from entering, and prevent foreign materials such as external dusts or the like from entering. In this case, since the breather portion 5 having the breather function is provided, the explosion preventing valve portion 4 is operated only in the case that the internal pressure of the pressure container suddenly increases.

Next, a description will be given of a pair of metal terminals 3. The metal terminals 3 are respectively inserted in the resin seal plate main body 2 in such a manner as to extend through in a thickness direction and are aluminum electrode terminals in the case of the aluminum electrolytic condenser. A drop-out preventing insert flange portion 18 formed in an annular shape as shown in FIG. 5 in an enlarged manner is provided on an outer peripheral surface 3a of the metal terminal 3, and the insert flange portion 18 is structured as follows.

That is, at first, the annular flange portion 18 is integrally formed on the outer peripheral surface 3a of the metal terminal outwardly in a diametrical direction, annular or cylindrical hook portions 19 and 20 are integrally formed in an outermost peripheral end portion of the insert flange portion 18 opposite each other in an axial and opposite direction, respectively, and a third hook portion 21 in an annular or cylindrical shape is integrally formed in an inner peripheral side of the hook portion 20 disposed in the lower side in FIG. 5 toward a lower direction.

An inner bottom surface 22a of an annular groove recess portion 22 provided in an inner peripheral side of the upper hook portion 19 is formed in a semicircular cross sectional shape or a circular arc cross sectional shape, whereby a thickness of a root portion 19a of the upper hook portion 19 positioned in the outer peripheral side of the inner bottom surface 22 becomes gradually thinner from a base side to an edge side. On the contrary, an edge portion 19b of the upper hook portion 19 is formed so that a thickness thereof is constant.

Then, sizes of the respective portions are set as follows.

That is, at first, a size is set so that the formula L1/L2≧1 is satisfied when setting a length of a whole of the upper hook portion 19 (a length in an axial direction, that is, a height) to L1 and a length of the root portion 19a in the upper hook portion 19 to L2. Further, a size is set so that the formula L3/L4≧1 is satisfied when setting a length of the lower hook portion 20 to L3 and a length of the third hook portion 21 to L4.

Accordingly, since the sizes of the respective portions are set as mentioned above and the lengths of the hook portions 19 and 20 in the outermost peripheral portion are set to be longer, the following functional effects can be obtained.

That is, there is a possibility that a gap is made on an interface between the seal plate main body 2 and the metal terminal 3 in the case of becoming a high temperature due to a reaction of the electrolyte in correspondence to a difference between a linear expansion coefficient of the material of the seal plate main body 2 and a linear expansion coefficient of the aluminum material of the metal terminal 3. However, by making the lengths of the outermost peripheral hook portions 19 and 20 longer, it is possible to have the aluminum outermost peripheral portion sufficiently followed to a change of expansion or contraction of the seal plate main body 2. Accordingly, it is possible to prevent the gap from being made in the interface between the seal plate main body 2 and the metal terminal 3 made of an aluminum and it is possible to improve a sealing performance of the portion.

Second Embodiment

Figure 6:
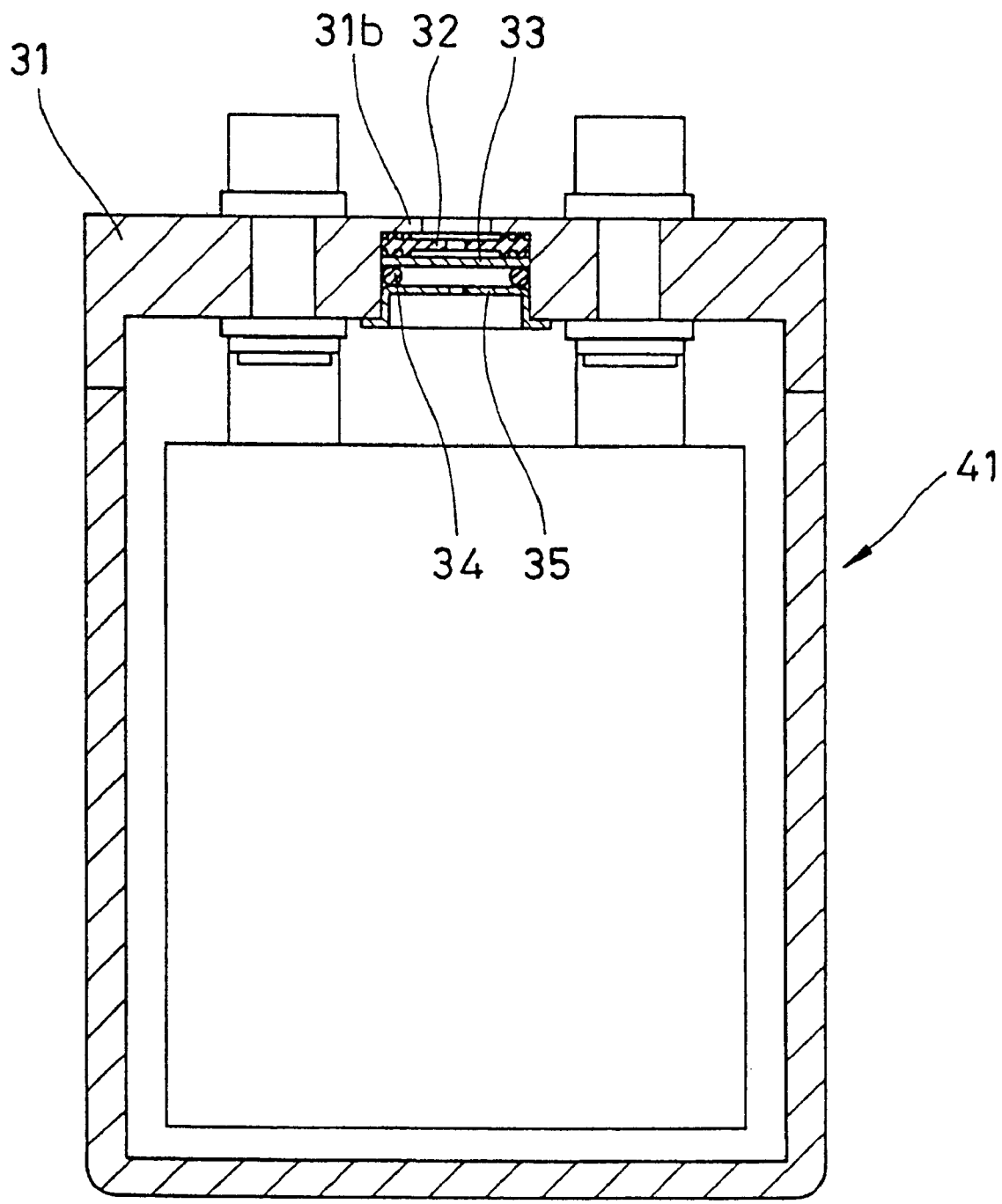
FIG. 6 is a cross sectional view of a condenser to which a pressure adjusting mechanism in accordance with a second embodiment of the present invention is attached.
Figure 7:
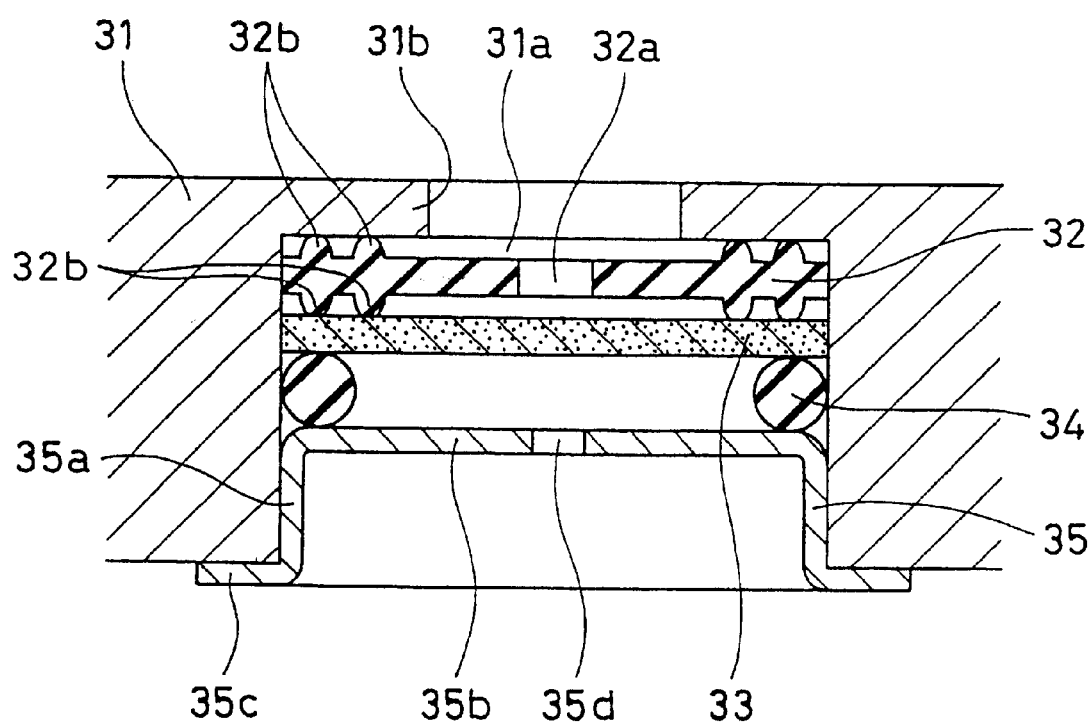
FIG. 7 is an enlarged view of a main portion in FIG. 6 and an enlarged cross sectional view of a pressure adjusting mechanism.

FIG. 6 shows a cross section of a condenser 41 to which a seal plate 31 having a pressure adjusting mechanism in accordance with a second embodiment of the present invention is attached, and a main portion thereof is shown in FIG. 7 in an enlarged manner. In FIG. 7, a lower portion corresponds to an inner portion side A of the condenser 41 and an upper portion corresponds to an outer side of the condenser 41 and an atmospheric air side B.

In the embodiment at first there is provided with the seal plate 31 formed in a plate shape from a rigid material such as resin including bakelite, PPS or the like, an opening portion 31a communicating an inner portion of the condenser 41 with an outer portion thereof is provided within a flat surface of the seal plate 31, an inward flange-like or flange-like engaging portion (also referred to as a drop-out preventing portion) 31b is provided at a position close to the atmospheric air side B in a peripheral edge portion of the opening portion 31a, and an outer holding body 32, a function membrane 33, an inner holding body 34 and a pressing member 35 are successively inserted from the inner portion side A of the condenser 41 to the opening portion 31a so as to be engaged with the engaging portion 31b.

Among these parts, at first, the outer holding body (the rubber-like elastic body sheet) 32 is formed in a sheet shape or a flat plate shape from a rubber-like elastic material such as a high saturated rubber or the like including silicone rubber, an ethylene propylene rubber (EPDM, EPM), butyl rubber, a rubber obtained by adding hydrogen to an unsaturated rubber or the like so as to hold the function membrane 33 in the outer side thereof, and is provided with a hole-like communication portion 32a in a center on the flat surface thereof, and further, bead portions 32b which are brought into close contact with the lower surface of the engaging portion 31b or the upper surface of the function membrane 33 so as to increase a sealing performance therebetween are integrally formed with the upper and lower surfaces of the outer peripheral edge portion, respectively. In the case that the holding body 32 is formed in a circular plate shape, the bead portion 32b is annularly formed and one or a plurality of (two in the drawing) bead portions 32b are coaxially provided in the circular plate.

The function membrane (hereinafter sometimes, simply referred to as a membrane) 33 is formed in a membrane shape or a flat surface shape from the porous body so as to release the pressure within the condenser 41 when the pressure becomes higher than the atmospheric pressure and suck the atmospheric air when the pressure within the condenser 41 becomes lower than the atmospheric pressure, thereby keeping the portion within the condenser 41 in the atmospheric pressure, and is formed by processing the PTFE (polytetrafluoroethylene) material excellent in a chemicals resistance by a drawing method so as to form a membrane-like porous body and coating a fluoro chemicals to the porous body so as to apply a water repellent treatment. The water repellent treatment is applied not only to the upper and lower surfaces thereof but also to the inner portion of the porous body with the fluoro chemicals. A size of the hole in the porous body is actually set to about 0.05 to 1 $\mu$m. Accordingly, by satisfying these conditions, the breather function is achieved from a state that a difference in pressure between the inside and outside of the condenser 41 is about 0.01 kg/cm$^2$ so as to keep the pressure within the condenser 41 at a certain level, so that there is structured "a breather" which prevents the condenser 41 from exploding and an interior sealed fluid such as an electrolyte or the like from leaking.

Further, in addition to PTFE, polyethylene, polypropylene, polyvinylidene fluoride (PVDF), cellulose acetate, polysulfone, polyacrylonitrile, polyamide, polyimide, polyamide imide or the like can be applied to the material of the function membrane 16, a producing method thereof can be selected in accordance with the material, the producing method includes a drawing method, a track etching method, a phase separation method, a phase transition method, a composite membrane method and the like, and the drawing method is suitable for the PTFE as mentioned above.

The drawing method is a method of applying heat to a crystalline polymer, adding a plasticizer so as to plasticize, thereafter drawing in a vertical direction, applying a strain to a film and expanding a periphery of a crystal area so as to form narrow holes, and can form a microfiltration membrane of polyethylene, polypropylene, PTFE or the like.

The inner holding body 34 is constituted as a damping member or a seal member interposed between the function membrane 33 and the pressing member 35, of an O-ring or a packing made of a rubber-like elastic material such as a high saturated rubber or the like including silicone rubber, ethylene propylene rubber (EPDM, EPM), butyl rubber, rubber obtained by adding hydrogen to an unsaturated rubber or the like.

Further, the pressing member 35 is formed from a rigid material such as a metal including aluminum or the like or a resin including PPS or the like so as to press a laminated part constituted of the outer holding body 32, the function membrane 33 and the inner holding body 34 into the opening portion 31a of the seal plate 31. The pressing member 35 is integrally provided with a cylindrical portion 35a pressure-inserted and fixed to an inner peripheral side of the opening portion 31a, a flat-plate cover portion 35b integrally formed in an upper end portion of the cylindrical portion 35a so as to press and support the laminated parts mentioned above, and an outward flange-like or flange-like engaging portion 35c integrally formed in a lower end portion of the cylindrical portion 35a and engaging with the opening peripheral edge portion of the seal plate 31 from the inner side A of the condenser 4 so as to specify a pressure-inserting amount. A hole-like communicating portion 35d is provided in a flat surface center of the cover portion 35b. In the case of the aluminum electrolytic condenser, a pure aluminum (99.7% or more) is proper to an aluminum as the forming material.

The pressure adjusting mechanism having the structure mentioned above is, as mentioned above, employed for the opening portion of the condenser 41 such as the aluminum electrolytic condenser, the electric double layer condenser or the like and the battery in place of the explosion preventing valve in the prior art mentioned above, and the following functional effects can be obtained by the structure mentioned above.

That is, at first, since the function membrane 33 constituted of the porous body and always keeping the pressure within the condenser 41 in the atmospheric pressure by releasing the pressure within the condenser 41 to the outside when the pressure becomes higher than the atmospheric pressure due to generation of the gas within the condenser 41 or the like and introducing the atmospheric air into the condenser 41 when the pressure within the condenser 41 becomes lower than the atmospheric pressure due to reduction of temperature within the condenser 41 or the like is provided so as to shut the opening portion 31a of the seal plate 31, it is possible to always keep the pressure within the condenser 41 in the atmospheric pressure state due to the gas permeable function or the breather function by the function membrane 33 constituted of the porous body, whereby exploding of the condenser 41 due to a high pressure stored within the condenser 41 can be. The gas permeable function or the breather function by the porous body has a stable operation property, and a magnitude of the difference in pressure between the inside and outside of the condenser 41 when the breather function is started can be adjusted by suitably changing the porous structure of the function membrane with respect to the size of the hole of the porous body or the like when producing the function membrane 33. Accordingly, it is also possible to prevent occurrence of dry-up by reducing an amount of reduction of the electrolyte within the condenser 41 in accordance with the adjustment mentioned above.

Further, the function membrane 33 is structured such as to optionally serve the breather function and is not the one-time consumable parts such as the breaking plate in the explosion preventing valve mentioned above. Accordingly, since it is possible to continuously use the function membrane 33 while optionally releasing the high pressure within the condenser 41, the structure is economical, and further, it is possible to omit a labor and time for replacing the parts with new ones at every time of releasing the pressure.

Further, the function membrane 33 serves for the optional breather function, and is not the structure of immediately releasing the high pressure after the pressure within the condenser 41 reaches the predetermined value like as the breaking plate in the explosion preventing valve mentioned above. Accordingly, since it is not necessary to provide the space such as the gas storage in the explosion preventing valve mentioned above in the condenser 41, it is possible to reduce an internal capacity of the condenser 41 at such degree as to make the condenser 41 compact.

Further, in the pressure adjusting mechanism mentioned above, since the function membrane 33 is constituted of the porous body and the water repellent treatment is applied to the inner and outer portions of the function membrane 33 constituted of the porous body, it is possible to prevent the liquid such as the electrolyte or the like within the condenser 41 from permeating through the function membrane 33 so as to leak to the outside even when the function membrane 33 always serves for the breather function. Further, on the contrary, it is possible to prevent the external liquid such as a rainwater or the like from permeating through the function membrane 33 so as to enter into the condenser 41.

Further, in the pressure adjusting mechanism mentioned above, since the pressing member 35 is provided as the constituting parts and the pressing member 35 presses the laminated parts constituted of the outer holding body 32, the function membrane 33 and the inner holding body 34 into the opening portion 31a of the seal plate 31, it is possible to prevent the function membrane 33 or the holding bodies 32 and 34 from being deformed at a level of or more than a certain amount due to the pressure within the condenser 41. Accordingly, it is possible to prevent the function membrane 33 or the holding bodies 32 and 34 from being largely deformed due to the pressure within the condenser 41 so as to be broken.

Further, in the pressure adjusting mechanism mentioned above, since the function membrane 33 is formed by processing PTFE material by the drawing method so as to form the membrane-like porous body and coating the fluoro chemicals to the porous body so as to apply the water repellent treatment thereto, it is possible to constitute the function membrane 33 being excellent in the chemicals resistance by making the best use of the property that PTFE is excellent in the chemicals resistance, and it is possible to effectively produce a lot of the function membrane 33 by punching out from one drawing sheet.

With respect to the structure of the holding bodies 32 and 34 for holding the function membrane 33 from the inner and outer portions thereof, various aspects can be considered. The holding bodies 32 and 34 may be structured any way as far as it can support the function membrane 33 constituted by the porous body so as to prevent the function membrane 33 from being largely deformed excessively.

Third Embodiment

Figure 8:
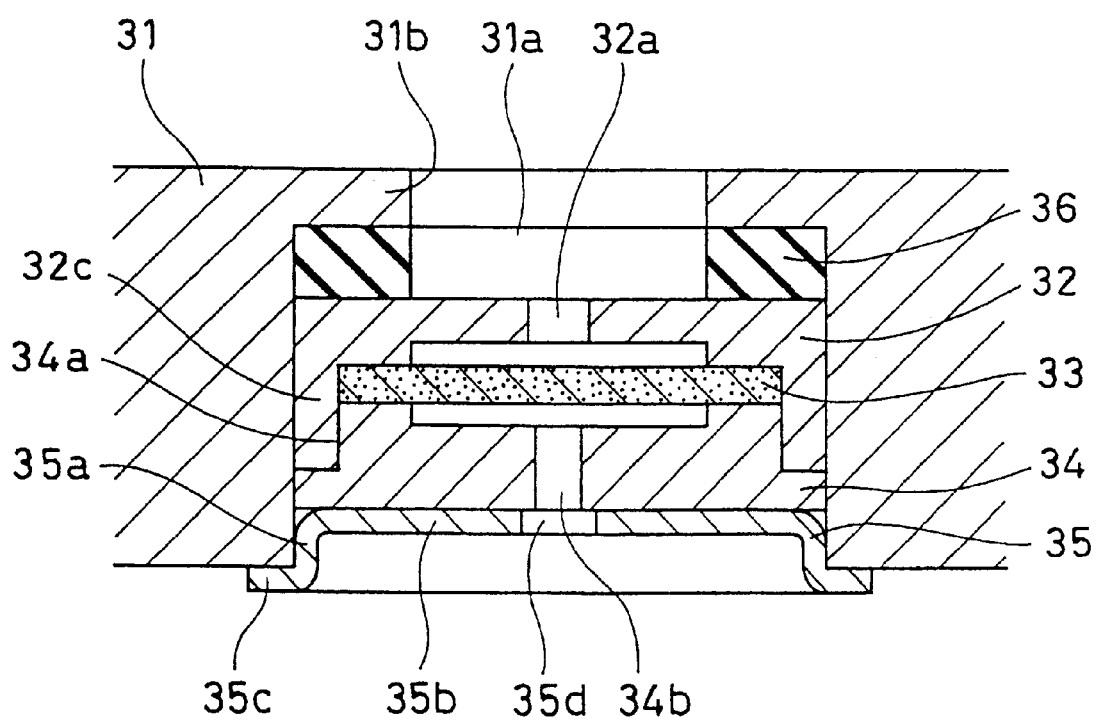
FIG. 8 is a cross sectional view of a pressure adjusting mechanism in accordance with a third embodiment of the present invention.

In an embodiment shown in FIG. 8, both of the inner and outer (upper and lower) holding bodies 32 and 34 are formed by a rigid material such as a metal including aluminum or the like or a resin including PPS or the like. This rigid material holding bodies 32 and 34 have engaging portions 32c and 34a engaging with each other so as to be positioned to each other, and grip the outer peripheral edge portion of the function membrane 33 from the upper and lower sides. An annular seal member 36 constituted of a rectangular cross sectional ring packing, an O-ring or the like is interposed between the outer (upper) supporting body 32 and the engaging portion 31b of the seal plate 31 so as to seal between both, and a hole-like communicating portion 34b is provided in a flat surface center of the inner (lower) supporting body 34. In this case, the inner supporting body 34 may be formed by a rubber-like elastic material and the pressing member 35 may be a washer type. Further, the holding bodies 32 and 34 and the function membrane 33 may be structured such that both of them are welded (thermally welded).

Fourth Embodiment

Figure 9:
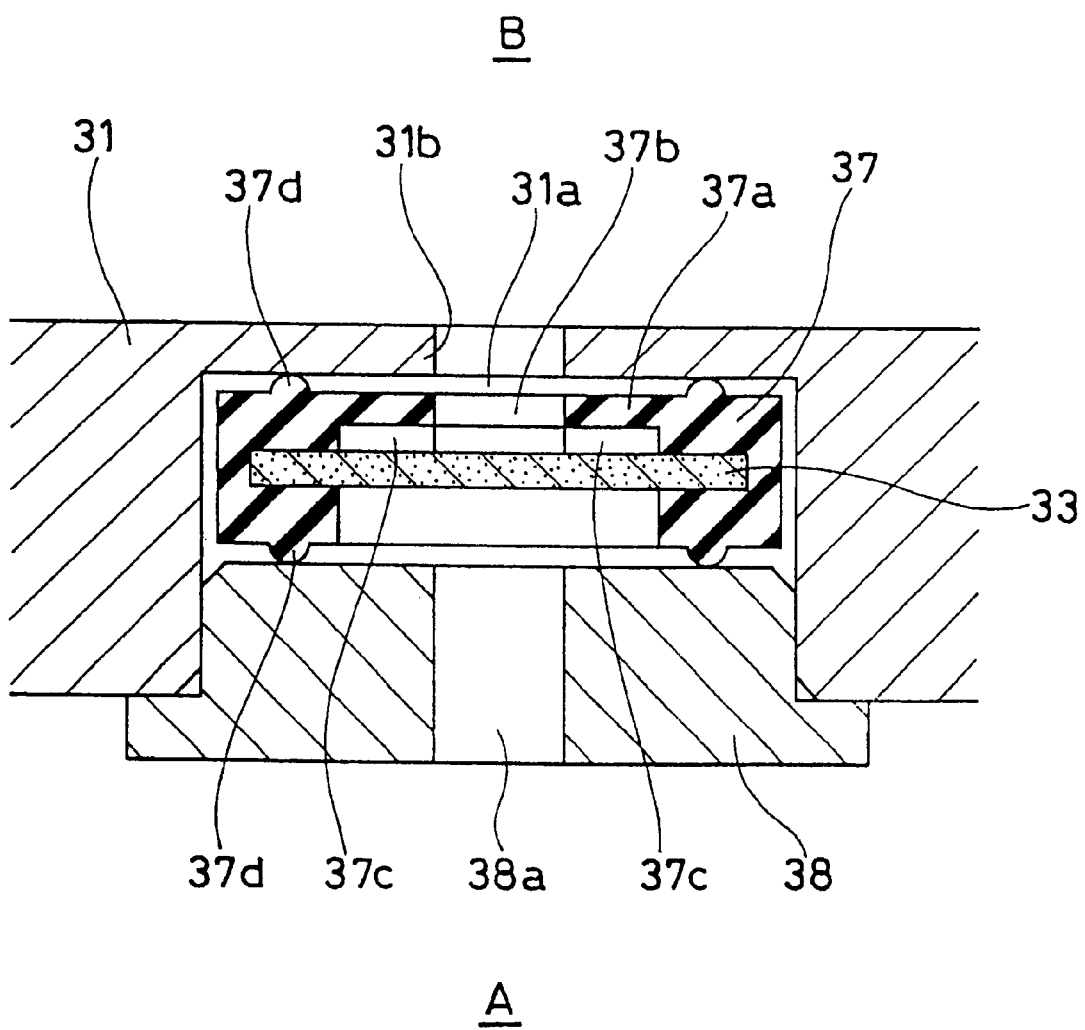
FIG. 9 is a cross sectional view of a pressure adjusting mechanism in accordance with a fourth embodiment of the present invention.

Further, as shown in FIG. 9, when previously assembling a rubber-like elastic material seal member (sometimes referred to as a rubber gasket) 37 covering both sides in the membrane thickness direction and the outer peripheral side of the outer peripheral edge portion of the function membrane 33 with the function membrane 33, the number of the parts required for assembling of the seal plate 31 or the pressure adjusting mechanism is reduced, so that it is possible to improve an assembly efficiency. The function membrane 33 is constituted of a porous body with continuous ventilation holes such as a porous PTFE or the like, and the seal member 37 is formed from a predetermined rubber. A hole-like communication portion 37b is provided on an upper surface portion 37a of the seal member 37, ribs 37c for preventing the function membrane 33 from being deformed due to the pressure is provided in a lower portion of the upper surface portion 37a, and bead portions 37d are respectively provided on both of the upper and lower surfaces. Further, when the outer peripheral edge portion of the function membrane 33 is covered with the seal member 37 as mentioned above, it is possible to effectively prevent the fluid within the container from leaking to the outside through the outer peripheral edge portion of the function membrane 33. Reference numeral 38 denotes a pressing member provided with a hole-like communication portion 38a, and the mechanism is characterized by being constituted only of two parts comprising the assembled part constituted of the function membrane 33 and the seal member 37 and the pressing member 38.

Fifth Embodiment

Figure 10:
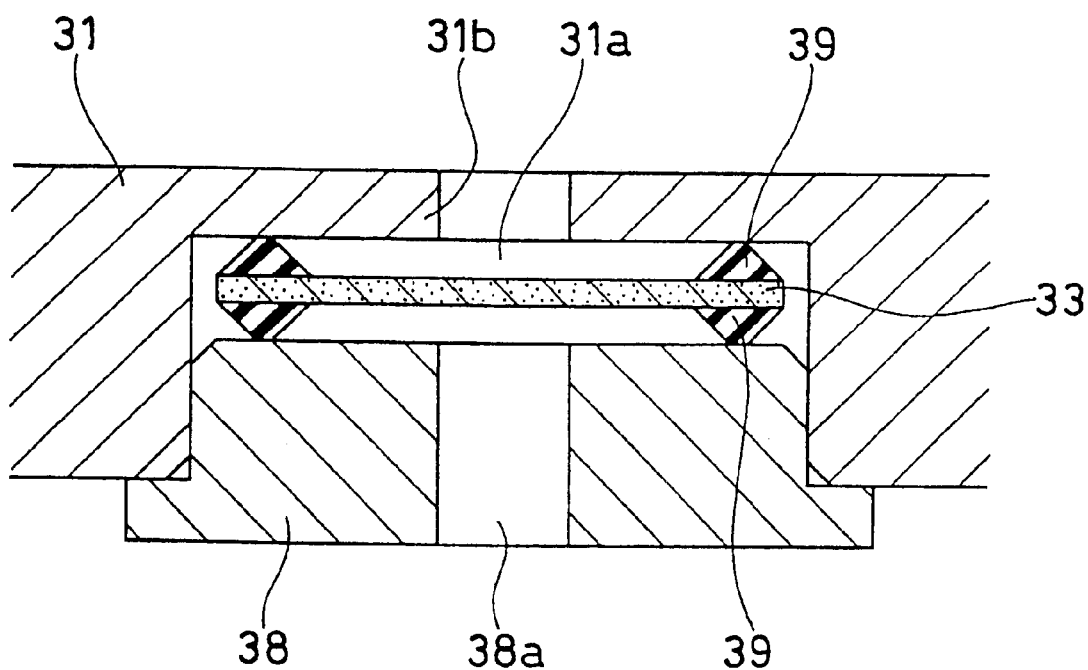
FIG. 10 is a cross sectional view of a pressure adjusting mechanism in accordance with a fifth embodiment of the present invention.

Further, as shown in FIG. 10, when previously assembling a rubber-like elastic material seal member 39 with both sides in the thickness direction of the function membrane 33 by an integral molding, the number of the parts required for assembling of the seal plate 31 or the pressure adjusting mechanism can be reduced, so that it is possible to improve an assembly efficiency. The function membrane 33 is constituted of a polypropylene porous membrane (PP membrane) with continuous ventilation holes, and the seal member 39 is formed from a predetermined rubber. Further, when previously assembling the seal members 39 on both of the upper and lower surfaces of the function membrane 33 by the integral molding as mentioned above, it is possible to effectively prevent the fluid within the container from leaking to the outside through the outer peripheral edge portion of the function membrane 33. Reference numeral 38 denotes a pressing member provided with the hole-like communication portion 38a, and the mechanism is characterized by being constituted only by two parts comprising the assembled part constituted of the function membrane 33 and the seal member 39 and the pressing member 38.

Sixth Embodiment

Figure 11:
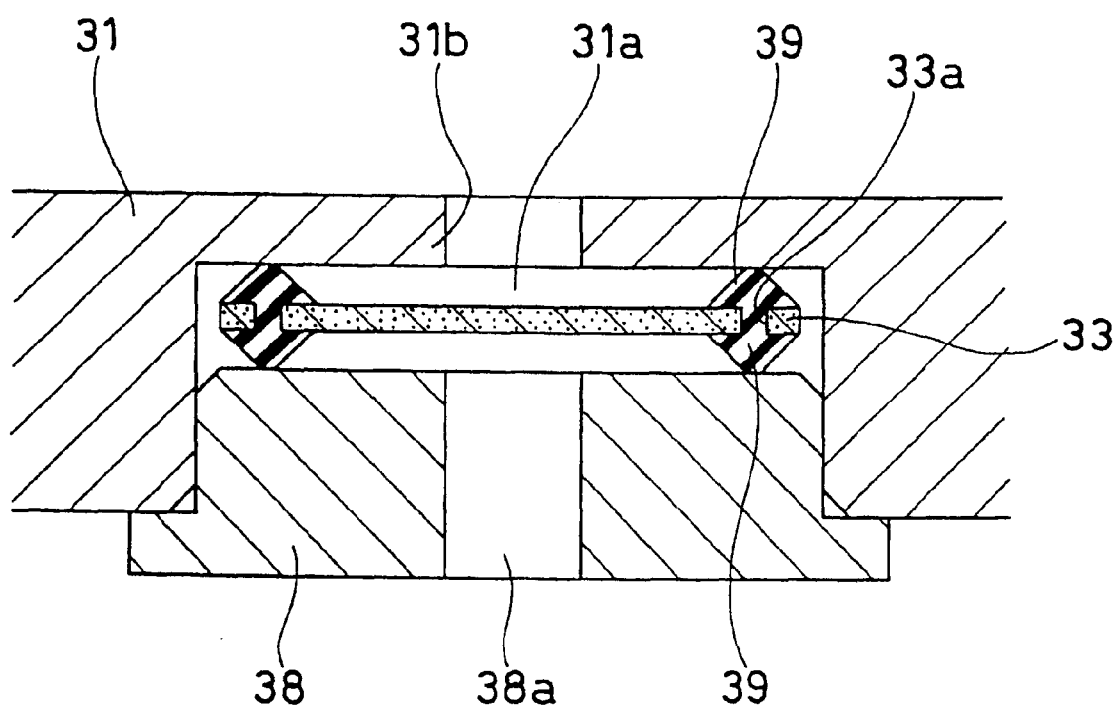
FIG. 11 is a cross sectional view of a pressure adjusting mechanism in accordance with a sixth embodiment of the present invention.

Further, as shown in FIG. 11, the seal member 39 on both of the upper and lower surfaces of the function membrane 33 may be structured such that both of the seal members 39 are integrally formed with each other by previously providing a through hole 33a in the function membrane 33.

EFFECT OF THE INVENTION AND INDUSTRIAL APPLICABILITY

The present invention has the following effects.

That is, at first, in the seal plate since the breaking plate is integrally formed with the resin seal plate main body for closing the opening portion of the pressure container, it is possible to make a dispersion of the breaking pressure smaller than the conventional one due to a material property of the resin material. Accordingly, it is possible to reduce the dispersion of the breaking pressure so as to easily control the breaking pressure. Further, since the seal plate main body and the breaking plate are integrally formed, it is possible to reduce the number of the parts in comparison with the conventional one.

Further, in addition, in the seal plate since the thin portion thinner than the breaking plate is integrally formed between the seal plate main body and the breaking plate and the inclined surface portion being made gradually thicker from the thickness of the thin portion is provided in the peripheral edge portion of the breaking plate, it is possible to concentrate the breaking portion to the thin portion and it is possible to surely break the breaking plate at this thin portion. Accordingly, it is possible to further easily control the breaking pressure.

Further, in the seal plate since the scattering prevention member such as the stop ring or the like for preventing the breaking plate from scattering to the outside of the seal plate when the breaking plate is broken, it is possible to prevent the breaking plate from scattering to the outside of the seal plate even when the breaking plate is broken due to the internal pressure increase of the pressure container. Accordingly, it is possible to previously prevent the breaking plate from scattering to the outside of the seal plate, colliding with the neighboring devices, and thereby breaking these devices.

Further, in the seal plate since there is provided the breather portion having the function membrane provided with the gas permeability and the liquid impermeability, the breather portion serves for the breather function, whereby it is unnecessary to secure the pressure absorbing space within the pressure container. Accordingly, it is possible to reduce the internal capacity of the pressure container and to make the pressure container compact.

Further, in the pressure adjusting mechanism since there is provided the function membrane releasing the pressure when the pressure within the pressure container becomes high and sucking the gas when the pressure within the pressure container becomes low so as to keep the inside of the pressure container in the atmospheric pressure, the function membrane being constituted of the porous body, it is possible to always keep the pressure within the pressure container in the atmospheric pressure due to the gas permeable function or the breather function by the function membrane, thereby previously preventing the high pressure being stored within the pressure container and preventing the pressure container from being exploded. The gas permeable function or the breather function due to the porous body has a stable operation property and a magnitude of the difference in pressure between the inside and outside of the pressure container at a time when the breather function is started can be adjusted by suitably changing the porous structure of the function membrane with respect to the size of the hole in the porous body or the like at a time of producing the function membrane. Accordingly, it is possible to prevent occurrence of dry-up by reducing the amount of reduction of the electrolyte within the pressure container in accordance with the adjustment mentioned above.

Further, the function membrane constituted of the porous body is structured such as to serve the optional breather function and is not the one-time consumable parts such as the breaking plate in the explosion preventing valve. Accordingly, since it is possible to continuously use the function membrane while optionally releasing the high pressure within the pressure container, the structure is economical and it is possible to omit the time and labor for replacing the parts with the new ones at every time of releasing the pressure.

Further, the function membrane is such structured as to serve for the optional breather function, and is not the structure immediately releasing the high pressure after the pressure within the pressure container reaches the predetermined value such as the breaking plate in the explosion preventing valve. Accordingly, since it is not necessary to provide the pressure absorbing space of the explosion preventing valve in the pressure container, it is possible to reduce the internal capacity of the pressure container, to make the pressure container compact.

Further, in addition, in the pressure adjusting mechanism since the water repellent treatment is applied to the function membrane so as to prevent the liquid from soaking into the function membrane constituted of the porous body, it is possible to prevent the liquid such as the electrolyte or the like within the pressure container from permeating through the function membrane so as to leak to the outside even when the function membrane is structured such as to always serve for the breather function. On the contrary, it is possible to prevent the external fluid such as rainwater or the like from permeating through the function membrane so and entering into the pressure container.

Further, in the pressure adjusting mechanism since the pressing member is provided so as to prevent the function membrane constituted of the porous body or the holding body thereof from being deformed to a level of or more than a certain amount due to the pressure, it is possible to prevent the function membrane or the holding body from being largely deformed and broke due to the pressure within the pressure container.

Further, in the pressure adjusting mechanism since the membrane-like porous body is formed by processing the PTFE material by the drawing method and the water repellent treatment is applied to the function membrane by coating the fluoro chemicals on the porous body, it is possible to constitute the function membrane excellent in a chemicals resistance by making the best use of the property that PTFE is excellent in the chemical resistance, and it is possible to effectively produce a lot of function membranes by punching out from one drawing sheet.

Further, in the pressure adjusting mechanism since the rubber-like elastic seal member covering both sides in the direction of the membrane thickness and the outer peripheral side of the peripheral edge portion of the function membrane is assembled with the function membrane, it is possible to improve the assembly efficiency and the sealing performance.

Further, in the pressure adjusting mechanism since the rubber-like elastic seal member is assembled with both sides in the direction of the membrane thickness of the function membrane by the integral molding, it is also possible to improve the assembly efficiency and the sealing performance.

Further, without having the rubber breaking plate with which it is hard to control the breaking pressure, it is possible to prevent the pressure within the pressure container from being abnormally increased and prevent the pressure container from being exploded.

What is claimed is:

1. A seal plate comprising:
    a breaking plate integrally formed with a resin seal plate main body for closing an opening portion of a pressure container,
    a thin portion integrally formed between said seal plate main body and said breaking plate and being thinner than said breaking plate, and
    an inclined surface portion formed to be gradually thicker than a thickness of said thin portion and provided in a peripheral edge portion of said breaking plate.

2. The seal plate as claimed in claim 1, wherein a stop ring is used as a scattering prevention member for preventing said breaking plate from scattering to outside of the seal plate when the breaking plate is broken.

3. The seal plate as claimed in claim 1, wherein a breather portion integrally molded with the seal plate includes a function membrane with gas permeability and liquid impermeability.

4. The pressure adjusting mechanism as claimed in claim 3 wherein an elastomer seal member for covering both sides in a direction of a membrane thickness and an outer peripheral side of a peripheral edge portion of the function membrane is assembled with said function membrane.

5. The pressure adjusting mechanism as claimed in claim 3 wherein an elastomer seal member is assembled with both sides in a direction of a membrane thickness of the function membrane by an integral molding.

6. A pressure adjusting mechanism used in a pressure container including one of a battery, an aluminum electrolytic condenser, an electric double layer condenser and a fuel cell, said pressure adjusting mechanism comprising:
    a breather portion integrally molded with a seal plate includes a function membrane for releasing a pressure of said pressure container when said pressure becomes high and sucking a gas when said pressure becomes low, thereby keeping an inside of said pressure container at an atmospheric pressure, said function membrane being constituted by a porous body.

7. The pressure adjusting mechanism as claimed in claim 6, wherein a water repellent treatment is applied to said function membrane so as to prevent a liquid from soaking into the function membrane constituted of a porous body.

8. The pressure adjusting mechanism as claimed in claim 6, wherein a pressing member is provided so as to prevent the function membrane constituted of the porous body and a holding body for the function membrane from being deformed to at least a predetermined level due to pressure.

9. The pressure adjusting mechanism as claimed in claim 6, wherein the porous body of the function membrane is formed by processing a PTFE material into a flat shape porous body by a drawing method and by applying a water repellent treatment by coating fluoro chemicals.

* * * * *